W. GORDON.
HORSE BLANKET.
APPLICATION FILED JAN. 16, 1909.
917,588.
Patented Apr. 6, 1909.
2 SHEETS—SHEET 1.
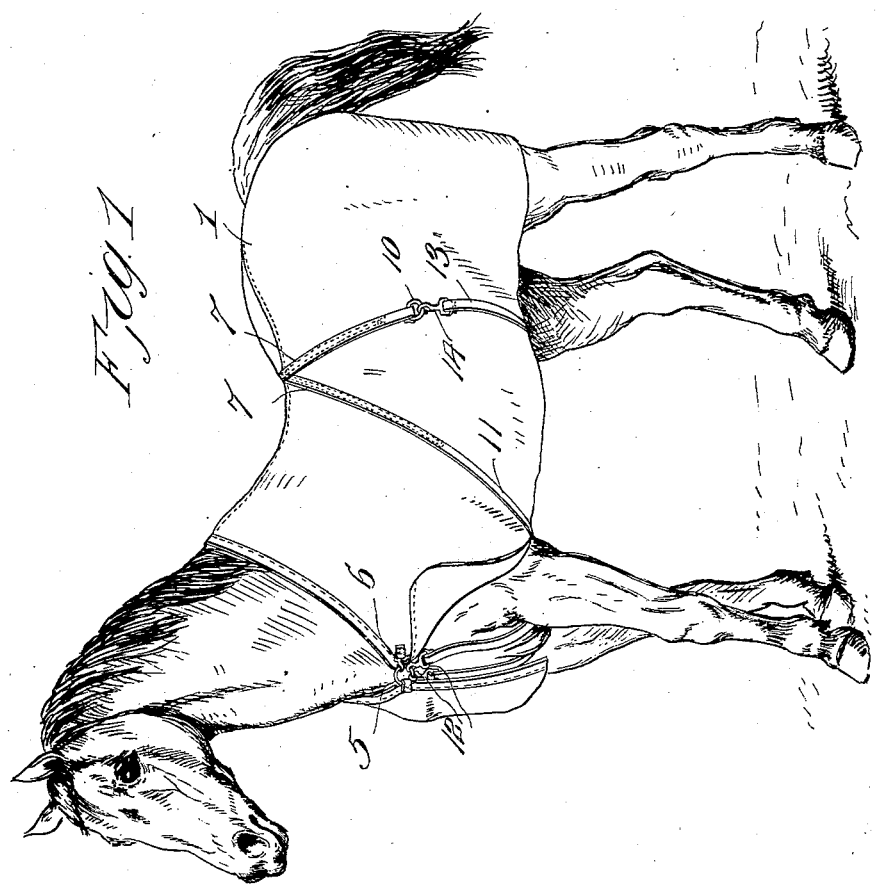
Witnesses
Frank Hough
Inventor
Winne Gordon,
By Victor J. Evans
Attorney

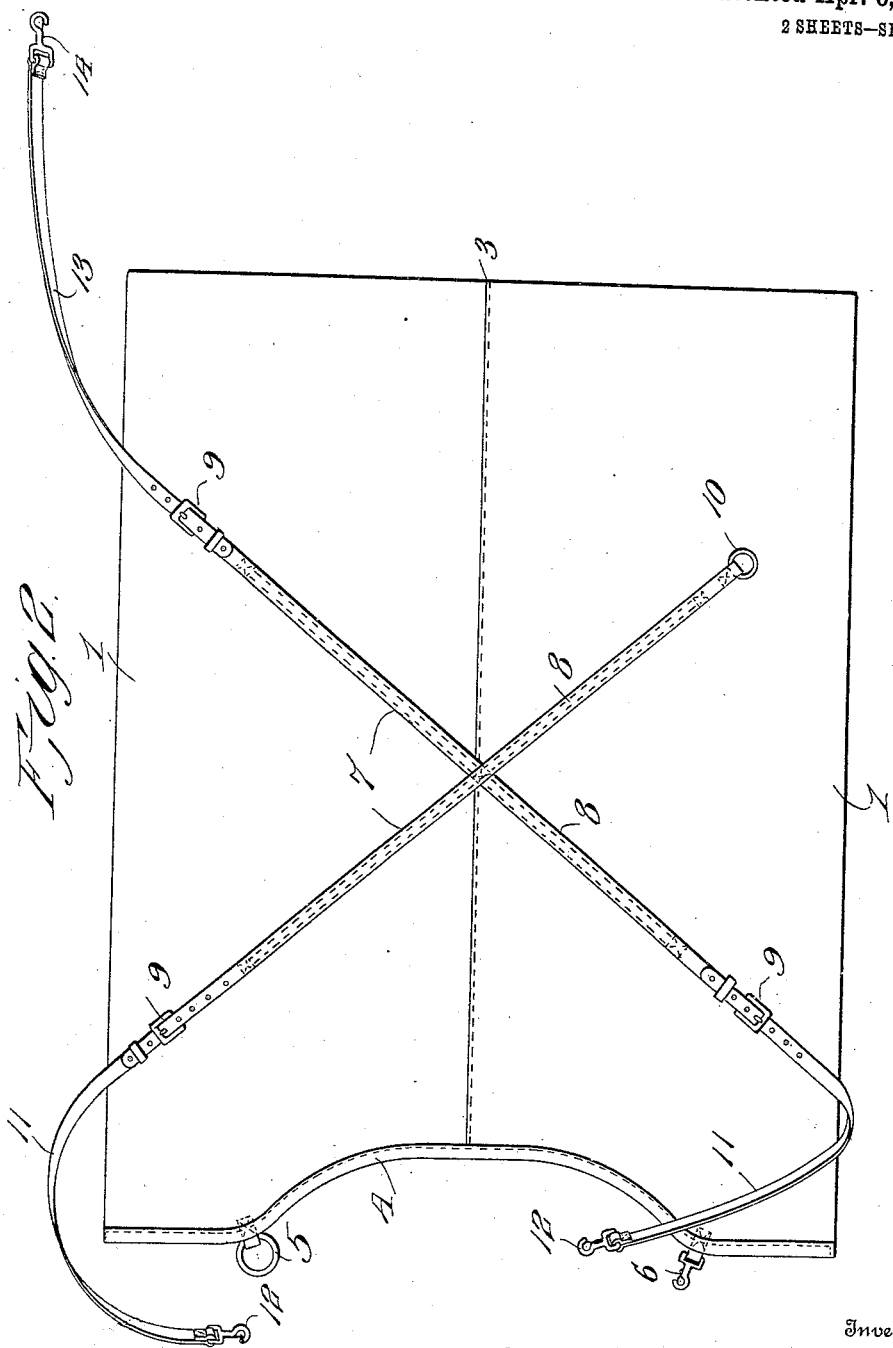

UNITED STATES PATENT OFFICE.

WINNE GORDON, OF CANAJOHARIE, NEW YORK.

HORSE-BLANKET.

No. 917,588.      Specification of Letters Patent.      Patented April 6, 1909.

Application filed January 16, 1909. Serial No. 472,710.

*To all whom it may concern:*

Be it known that I, WINNE GORDON, a citizen of the United States of America, residing at Canajoharie, in the county of Montgomery and State of New York, have invented new and useful Improvements in Horse-Blankets, of which the following is a specification.

This invention relates to horse blankets, and one of the principal objects of the same is to provide simple and reliable means for holding the blanket upon the horse to prevent the same from slipping sidewise or from moving or getting out of place upon the horse.

Another object of the invention is to provide adjustable means for securing the blanket upon the horse, said means being easy to connect and detach and which shall provide means for securing the blanket which will be easy to the horse and not readily displaced in use.

These and other objects may be attained by means of the construction illustrated in the accompanying drawings, in which,—

Figure 1 is a perspective view illustrating the horse blanket secured to a horse. Fig. 2 is a top plan view of the blanket detached from the horse.

Referring to the drawing, the numeral 1 designates the horse blanket which may be of any suitable shape or construction. The blanket shown is made of two sections having a central seam 3, and the neck portion of the blanket is cut out to fit the neck of the animal and provided with a suitable binding 4. Upon one side of the neck opening a ring 5 is secured, and upon the opposite side a snap hook 6 is attached, said snap hook being designed to engage the ring 5 to hold the blanket around the neck of the animal. At a point near the longitudinal center of the blanket a pair of crossed straps 7 are secured by stitches 8 to the blanket, the ends of said straps being unattached to the blanket and provided with buckles 9. One of said straps at the rear is provided with a ring 10. Adjustably connected to the front ends of the straps 7 are the fastening straps 11 designed to extend downwardly and between the front legs of the animal, said straps being provided with snap hooks 12, both designed to engage the ring 5 after the snap hook 6 has been engaged therewith, as shown more particularly in Fig. 1. Connected to the rear end of one of the straps 7 is a flank strap or surcingle 13 provided with a snap hook 14 adapted to engage the ring 10 after the surcingle has been passed under the horse, as shown in Fig. 1.

From the foregoing it will be obvious that when the blanket has been placed upon the animal and the snap hook 6 is engaged with the ring 5, the two leg straps 11 may be passed between the front legs of the horse and connected to the ring 5 by means of the snap hooks 12, and that the surcingle or flank strap is passed under the horse and connected to the ring 10 by means of the snap hook 14. By means of the cross straps, the front leg straps and the flank strap or surcingle the blanket is held firmly upon the horse without the use of a crupper, and the blanket is prevented from side or endwise movement. Moreover, the blanket is readily put on or taken off.

I claim:—

1. A horse blanket provided with crossed straps secured to the blanket and provided with adjusting devices at their ends, leg straps adjustable to the front ends of said crossed straps and adapted to extend between the front legs of the horse, a ring connected to the front of the blanket, a snap hook adapted to engage said ring and snap hooks upon the ends of the leg straps for engaging said ring, a surcingle or flank strap connected to the rear end of one of said cross straps to pass under the body of the horse, and a ring connected to the rear end of the other crossed strap to engage a snap hook on said flank strap.

2. A horse blanket provided at the neck with a ring and snap hook for securing the blanket around the neck of the animal, cross straps secured to the blanket and provided with leg straps having snap hooks at their front ends adapted to be engaged with said ring, and a flank strap secured to the rear end of one of said cross straps.

3. A horse blanket provided with a ring and snap hook at the neck portion thereof, leg straps connected to the blanket and extending between the front legs and provided with snap hooks to engage said ring.

4. A horse blanket provided with cross straps secured to said blanket and provided with detached ends, buckles connected to the front ends of said strap, leg straps adjustably connected to said buckles and provided with snap hooks at their outer ends, a buckle connected to the rear end of one of said cross straps, a surcingle adjustably connected to said buckle, a snap hook on the end of said surcingle, and a ring on the rear end of the other cross strap.

In testimony whereof I affix my signature in presence of two witnesses.

WINNE GORDON.

—Witnesses:
  JOHN G. SMITH,
  E. K. ELDREDGE.